(12) United States Patent
Zheng et al.

(10) Patent No.: US 10,409,853 B2
(45) Date of Patent: Sep. 10, 2019

(54) IMAGE FILTERING METHOD AND IMAGE FILTERING SYSTEM

(71) Applicant: HUIZHOU TCL MOBILE COMMUNICATION CO., LTD., Huizhou (CN)

(72) Inventors: Yu Zheng, Huizhou (CN); Zongmin Ye, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 346 days.

(21) Appl. No.: 15/309,383

(22) PCT Filed: Oct. 16, 2015

(86) PCT No.: PCT/CN2015/092111
§ 371 (c)(1),
(2) Date: Nov. 7, 2016

(87) PCT Pub. No.: WO2016/165298
PCT Pub. Date: Oct. 20, 2016

(65) Prior Publication Data
US 2018/0107661 A1    Apr. 19, 2018

(30) Foreign Application Priority Data

Apr. 16, 2015 (CN) .......................... 2015 1 0180325

(51) Int. Cl.
*G06F 16/51* (2019.01)
*G06F 16/583* (2019.01)
*G06F 16/58* (2019.01)

(52) U.S. Cl.
CPC .......... *G06F 16/51* (2019.01); *G06F 16/5838* (2019.01); *G06F 16/5866* (2019.01)

(58) Field of Classification Search
CPC .......... G06F 17/30256; G06F 17/3028; G06F 17/30268; G06F 16/51; G06F 16/5866; G06F 16/5838
See application file for complete search history.

(56) References Cited

U.S. PATENT DOCUMENTS 6,754,397 B1 * 6/2004 Westerman ............... G06T 3/40
                                                       382/260
8,429,173 B1 * 4/2013 Rosenberg .......... G06F 16/5866
                                                       707/748

(Continued)

FOREIGN PATENT DOCUMENTS

CN    102096805 A    6/2011
CN    102880729 A    1/2013

(Continued)

*Primary Examiner* — Hasanul Mobin
(74) *Attorney, Agent, or Firm* — Shimokaji IP

(57) ABSTRACT

An image filtering method is provided, including: acquiring a sample characteristic value of a sample image; ranking images to be filtered in a specific chronological order; acquiring characteristic values of the images to be filtered; comparing the characteristic values of the images to be filtered with that of the sample image, selecting, from the images, filtered images conforming to preset conditions, storing the filtered images in the specific chronological order, and displaying the filtered images. Accordingly, a user is enabled to easily find identical or similar images amongst a large number of images.

12 Claims, 3 Drawing Sheets

(56) References Cited

U.S. PATENT DOCUMENTS

| | | | | |
|---|---|---|---|---|
| 8,682,142 B1* | 3/2014 | Boskovitz | ............ | G11B 27/034 386/278 |
| 8,832,096 B1* | 9/2014 | Jing | ...................... | G06F 16/583 707/727 |
| 8,898,150 B1* | 11/2014 | Kuramochi | ............. | G06F 16/58 707/722 |
| 2001/0033693 A1* | 10/2001 | Seol | ...................... | G06F 16/739 382/219 |
| 2009/0285501 A1* | 11/2009 | Hoshino | ............. | H04N 1/6011 382/260 |
| 2010/0023507 A1* | 1/2010 | Kim | .................... | G06F 17/3025 707/E17.03 |
| 2010/0145982 A1* | 6/2010 | Iwase | ................ | G06F 17/30277 707/769 |
| 2012/0109943 A1* | 5/2012 | Yang | ...................... | G06F 16/40 707/723 |
| 2013/0073985 A1* | 3/2013 | Hamlin | ................ | G06F 3/0481 715/753 |
| 2014/0301653 A1* | 10/2014 | Murphy-Chutorian | ...................... | G06K 9/00221 382/224 |
| 2015/0161174 A1* | 6/2015 | Kumar | ................ | G06K 9/6224 707/769 |
| 2015/0161217 A1* | 6/2015 | Zhang | ................ | G06K 9/6254 707/722 |
| 2016/0062845 A1* | 3/2016 | Mo | .................... | G06F 16/2365 707/685 |
| 2016/0300334 A1* | 10/2016 | Chen | ...................... | G06T 5/006 |

FOREIGN PATENT DOCUMENTS

| | | |
|---|---|---|
| CN | 104298707 A | 1/2015 |
| CN | 104794189 A | 7/2015 |

\* cited by examiner

IMAGE FILTERING METHOD AND IMAGE FILTERING SYSTEM

TECHNICAL FIELD

The present disclosure relates to the field of image processing technology. In particular, the present disclosure relates to an image filtering method and an image filtering system.

BACKGROUND

Image identification technology is more and more widely applied in real life, and 3D photographs and image technologies have become mature and popular. However, with regards to analysis techniques such as face identification, most of these techniques are still confined to fields such as security and monitoring. With the development of cloud computing, and cloud storage, and mass storage, analysis and processing of a large number of photos from individuals and enterprises will be required. While storing a large number of images with historical continuity is known, methods for presenting a series of images with identical or similar characteristics in a specific order are still unavailable.

Therefore, there is a need for an improved method of filtering and displaying images with similar characteristics.

SUMMARY

In light of the deficiencies of the prior art, an image filtering method and an image filtering system is described. Advantageously, identical images found by users can be ranked in a chronological order.

An image filtering method is provided, wherein the method includes:

acquiring a sample characteristic value of a sample image in advance and storing the sample characteristic value, wherein the sample characteristic value is provided by one of an image identification analysis and a user input;

ranking a plurality of images to be filtered in a specific chronological order;

acquiring characteristic values of the plurality of images, and storing the characteristic values in the specific chronological order; and comparing the characteristic values of the plurality of images with the sample characteristic value, selecting, from the plurality of images, filtered images having characteristic values identical or within a match range of the sample characteristic value, storing the filtered images in the specific chronological order, and displaying the filtered images.

The method may further include:

after the selecting ends or after a total number of files searched based on a width of the match range exceeds a time span allocated for target files to be searched during the selecting, adjusting the width and a center value of the match range.

The adjusting of the width and the center value of the match range may include:

averaging characteristic values of a last Y match results searched to generate an average value, and replacing the center value of the match range with the average value, wherein Y is a preset constant; and restarting the selecting from a position corresponding to a file having a match result when the selecting ends, and continuing the selecting until completion.

The specific chronological order may be one of an increasing order along a time axis, a decreasing order along the time axis, and an order of ranking along either direction of the time axis from a time point.

The acquiring the characteristic values of the plurality of images, and storing the characteristic values in the specific chronological order may include:

analyzing the plurality of images using one or more image identification technologies according to a consistent standard, and storing a resulting characteristic value corresponding to each of the plurality of images in the specific chronological order.

An image filtering method is also described, wherein the method includes:

acquiring a sample characteristic value of a sample image in advance and storing the sample characteristic value;

ranking a plurality of images to be filtered in a specific chronological order;

acquiring characteristic values of the plurality of images, and storing the characteristic values in the specific chronological order; and comparing the characteristic values of the plurality of images with the sample characteristic value, selecting, from the plurality of images, filtered images conforming to preset conditions, storing the filtered images in the specific chronological order, and displaying the filtered images.

The acquiring the sample characteristic value of the sample image may include:

acquiring the sample characteristic value from one of an image identification analysis and a user input.

The preset condition may include the characteristic values of the filtered images being identical or within a match range of the sample characteristic value.

The image filtering method may further include:

after the selecting ends or after a total number of files searched based on a width of the match range exceeds a time span allocated for target files to be searched during the selecting, adjusting the width and a center value of the match range.

The adjusting of the width and the center value of the match range in the image filtering method may include:

averaging characteristic values of a last Y match results searched to generate an average value, and replacing the center value of the match range with the average value, wherein Y is a preset constant; and restarting the selecting from a position corresponding to a file having a match result when the selecting ends, and continuing the selecting until completion.

The specific chronological order may be one of an increasing order along a time axis, a decreasing order along the time axis, and an order of ranking along either direction of the time axis from a time point.

An image filtering system is also provided, wherein the system may include:

a pre-storage module acquiring a sample characteristic value of a sample image in advance and storing the sample characteristic value;

a ranking module ranking a plurality of images to be filtered in a specific chronological order;

a characteristic value acquisition module acquiring characteristic values of the plurality of images, and storing the characteristic values in the specific chronological order; and a filtering and displaying module comparing the characteristic values of the plurality of images with the sample characteristic value, selecting, from the plurality of images, filtered images conforming to preset conditions, storing the filtered images in the specific chronological order, and displaying the filtered images.

The pre-storage module may include:

an acquiring and receiving unit acquiring the sample characteristic value from one of an image identification analysis and a user input.

The preset condition may be that the characteristic values of the filtered images being identical or within a match range of the sample characteristic value.

The filtering and displaying module may include:

a determination unit adjusting the width and a center value of the match range after the selecting ends or after a total number of files searched based on a width of the match range exceeds a time span allocated for target files to be searched during the selecting;

an adjustment unit averaging characteristic values of a last Y match results searched to generate an average value, and replacing the center value of the match range with the average value, wherein Y is a preset constant;

a search unit restarting the selecting from a position corresponding to a file having a match result when the selecting ends, and continuing the selecting until completion.

An image filtering method and an image filtering system is thus provided, with the method including: acquiring a sample characteristic value of a sample image in advance and storing the sample characteristic value; ranking a plurality of images to be filtered in a specific chronological order; acquiring characteristic values of the plurality of images, and storing the characteristic values in the specific chronological order; and comparing the characteristic values of the plurality of images with the sample characteristic value, selecting, from the plurality of images, filtered images conforming to preset conditions, storing the filtered images in the specific chronological order, and displaying the filtered images. In this manner, images with identical or similar characteristic values can be displayed in a specific chronological order, which facilitates users to look up images with identical or similar characteristics among a large number of images. The methods and systems can be applied in an entertainment application of a mobile terminal, and is convenient for users to collect and search information.

DETAILED DESCRIPTION

In order to make the purpose, technical solutions and advantages of the present invention more clear, the invention is described in detail in combination with accompanied figures and exemplary embodiments. It should be understood that exemplary embodiments described herein are for illustrative purposes only. The exemplary embodiments are not intended to limit the scope of the claimed invention in any way.

Figure 1:
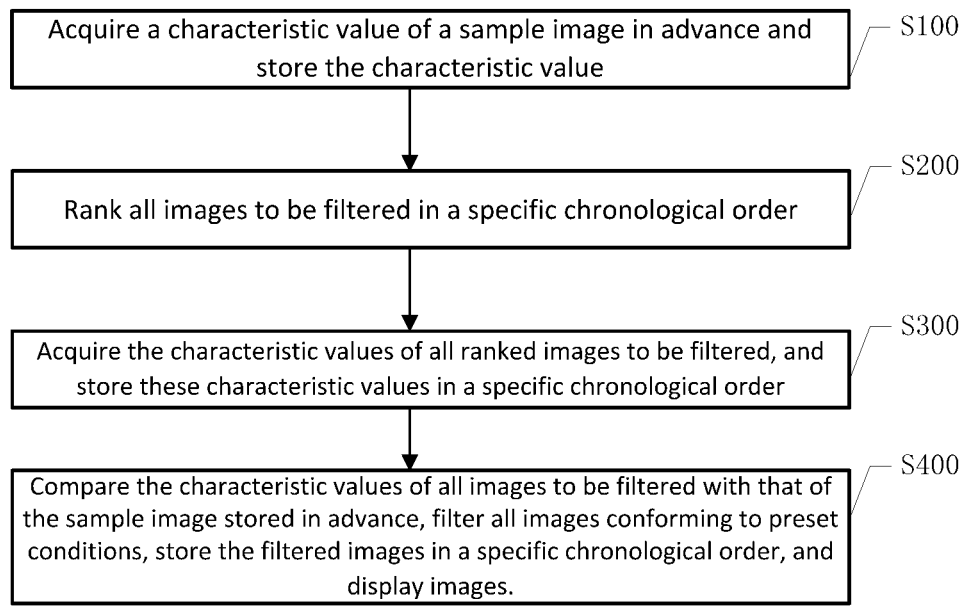
FIG. 1 depicts a flowchart of an image filtering method, according to an exemplary embodiment of the present invention.

Turning to FIG. 1, FIG. 1 depicts a flowchart of an image filtering method, according to an exemplary embodiment of the present invention. The method may include:

acquiring a sample characteristic value of a sample image in advance and storing the sample characteristic value; (block S100)

In an example, the acquiring of the sample characteristic value of the sample image may include:

acquiring a sample characteristic value of a sample image from one of an image identification analysis (for example, image identification based on eye characteristic, identification based on 3D characteristics of facial organs) and a user input (for example, receiving a command of the sample characteristic value that is entered by a user). Accordingly, image identification technology can be used to analyze and collect the characteristic values of sample images provided by users, or users can directly enter the characteristic values of the sample images. Characteristic value may correspond to one or a group of outputs acquired upon analysis and processing of image with the image identification analysis.

The invention does not specially limit the way by which a user can provide a sample image. For example, a user can select the image in a file as a sample image. The invention does not specially limit the formats of the sample images provided by users, and image formats include but are not limited to JPG, BMP and PNG. The invention does not specially limit the manufacturing technology of sample images provided by users, and technology includes but is not limited to 2D and 3D technologies. The invention does not specially limit the image identification analysis method. The invention does not specially define the way of storing characteristic values (such as a ratio of dark part and white part of eyes) of samples. For example, characteristic values can be stored in database.

The method may further include: ranking all images to be filtered in a specific chronological order; (block S200)

The specific chronological order may be one of an increasing order along a time axis, a decreasing order along the time axis, and an order of ranking along either direction of the time axis from a time point.

The method may further include: acquiring characteristic values of the plurality of images, and storing the characteristic values in the specific chronological order; (block S300)

The image files may be analyzed sequentially or one by one by using one or more image identification technologies according to a consistent standard, and the identifier of every image or the image itself or both the image and identifier thereof is stored in the specific chronological order. An identifier is information for identifying an image from the file storage system so as to distinguish the image from other image files, such as but not limited to file name plus address, ID or identifier of the file in a database. The invention does not limit the specific form of the identifier.

The method may further include: comparing the characteristic values of all images to be filtered with that of the sample image stored in advance, filtering all images conforming to preset conditions, storing the filtered images in a specific chronological order, and displaying images. (block S400)

In an example, the characteristic values of the stored images and the stored samples are compared one by one in the order above to filter images with characteristic values being identical or characteristic values being within a match range. Images with characteristic values not within the match range may be deleted from the stored images (if the match range is not defined, images with incompletely identical characteristic values are deleted), and identified image information is stored in order. The match range refers to a user-defined fault-tolerance or a fuzzy range of characteristic values. The way of defining the match range is not limited by this method, and may be selected and decided by the user based on any suitable algorithm. Information of an image includes but is not limited to the image itself and identifier thereof. Lastly, the stored images are presented to user based on the match results.

The preset condition may be that characteristic values of the filtered images being identical or within a match range of ±M %. For example, the proportion of eyes in the whole face can have a ±M % fault-tolerant range. The M % can be determined as required, and can be specifically 2%, 3%, 5%, 10%, etc.

Block S400 may further comprise:

after the selecting ends or after a total number of files searched based on a width of the match range exceeds a time span allocated for target files to be searched during the selecting, adjusting the width and a center value of the match range. For example, assuming that the sample characteristic value of a long integer type generated upon identification of eye characteristics of a sample image using a particular image identification analysis corresponds to X, and assuming the match width is set to be a % during matching, then match results with identified characteristic values between (X−X*a %) and (X+X*a %) are valid. For example, X can be any integer from 10 to 100, and the range of a % is 1-10. However, both X and a % can be determined based on particular user needs.

Adjusting the width and the center value of the match range may include:

averaging characteristic values of a last Y match results searched to generate an average value, and replacing the center value of the match range with the average value, wherein Y is a preset constant, wherein Y can be selected from 10, 20 and 30, or from any other value based on user needs; and restarting the selecting from a position corresponding to a file having a match result when the selecting ends, and continuing the selecting until completion.

Figure 2:
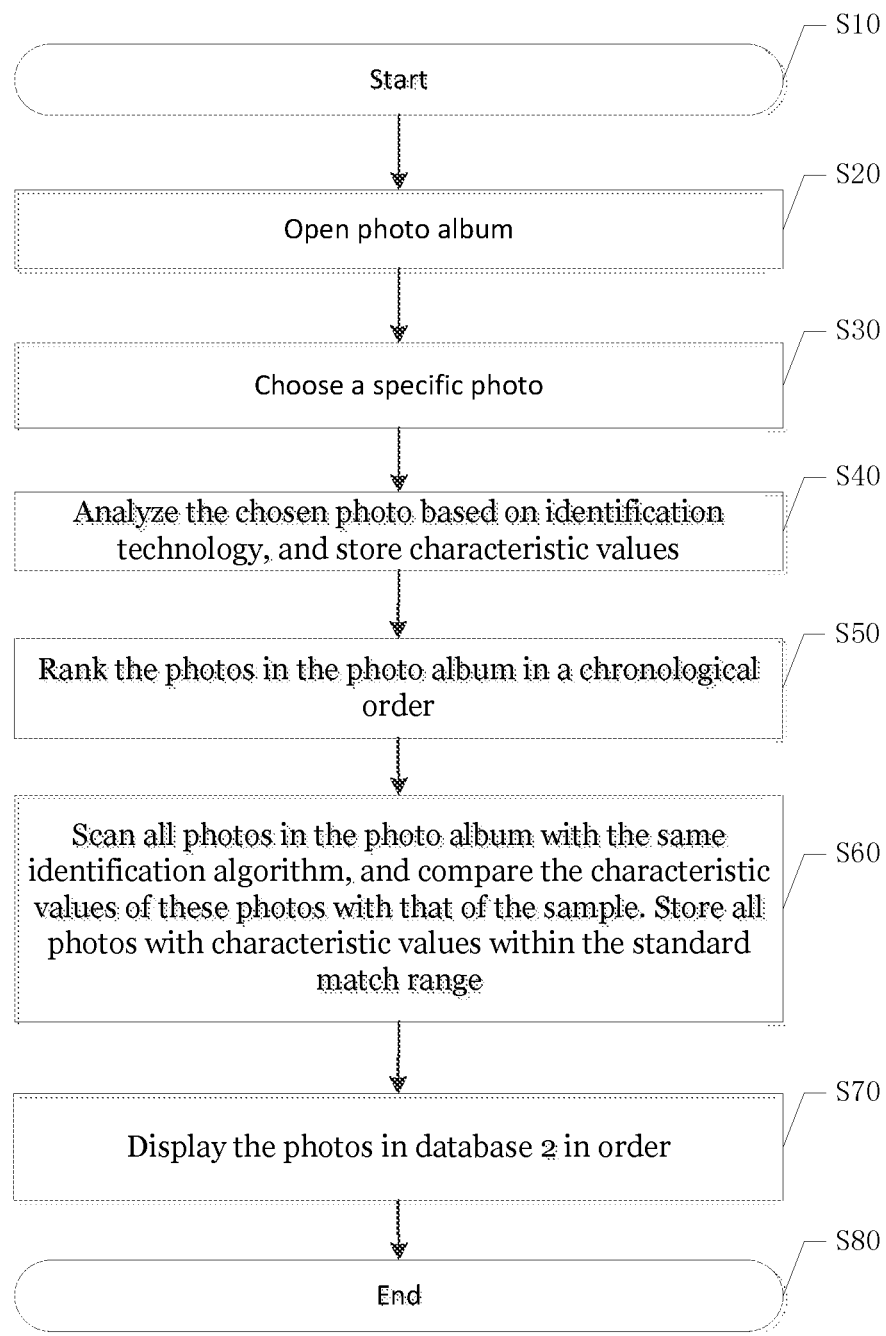
FIG. 2 depicts a flowchart of an image filtering method, according to another exemplary embodiment of the present invention.
Figure 3:
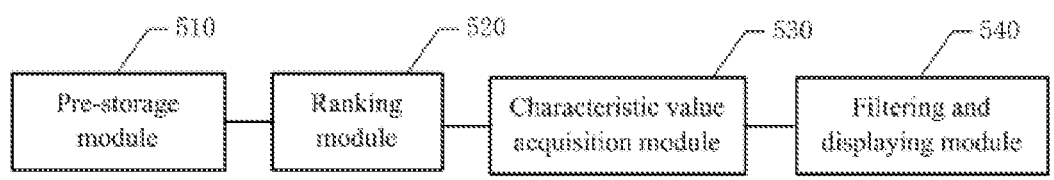
FIG. 3 depicts a functional block diagram of an image filtering system, according to an exemplary embodiment of the present invention.

In an example of an image filtering method (see FIG. 2), the method comprises:

starting image filtering; (block S10)

opening a photo album in a device; (block S20)

choosing a specific photo as a sample; (block S30)

analyzing the chosen photo with image identification analysis, storing a characteristic value of the photo, and storing the characteristic value in database 1; (block S40)

ranking the photos in the photo album in a chronological order; (block S50)

scanning all photos in the photo album with the same identification analysis, comparing the photos with the sample in terms of characteristic value, storing photos with characteristic values within the match range, and storing the matched photos in database 2; (block S60)

displaying the photos in database 2 in order; (block S70) and image filtering ends. (block S80)

According to the examples above, an image filtering method has been provided. The characteristic values of sample images to be filtered are pre-defined, the images to be filtered are ranked in a certain chronological order and then compared with the sample image in terms of characteristic value; lastly, images with characteristic values within a match range are filtered and displayed, so that users can display the images they are interested in within a specific chronological order, which facilitates users to look up images among a large number of images.

It should be understood that the application of the present invention is not limited to the examples above. Those skilled in the art can improve or change the invention based on the descriptions above, and the improvement and changes shall fall within the protection scope of the appended claims.

What is claimed is:

1. An image filtering method for an image filtering system, wherein the image filtering system comprises a pre-storage module, a ranking module, a characteristic value acquisition module, and a filtering and displaying module, the method comprising:

computing and acquiring, via the pre-storage module, a sample characteristic value of a sample image in advance and storing the sample characteristic value in a first database, wherein the sample characteristic value is provided by one of an image identification analysis and a user input;

ranking, via the ranking module, a plurality of images in a specific chronological order, wherein the specific chronological order is one of an increasing order along a time axis, a decreasing order along the time axis, and an order of ranking along either direction of the time axis from a time point;

computing and acquiring, via the characteristic value acquisition module, characteristic values of the plurality of images using one or more image identification technologies, and storing the characteristic values in the specific chronological order; and comparing, via the filtering and displaying module, the characteristic values of the plurality of images with the sample characteristic value, selecting, from the plurality of images, filtered images having characteristic values identical or within a match range of the sample characteristic value, deleting, from the plurality of images, images with characteristic values not conforming to preset conditions, storing the filtered images in the specific chronological order in a second database, and displaying the filtered images, wherein the match range of the sample characteristic value is a predetermined fault-tolerance or a fuzzy range of characteristic values, wherein after the selecting ends or after a total number of files searched based on a width of the match range of the sample characteristic value exceeds a time span allocated for target files to be searched during the selecting, adjusting the width and a center value of the match range of the sample characteristic value, wherein the width of the match range is a predetermined value.

2. The image filtering method according to claim 1, wherein the adjusting of the width and the center value of the match range comprises:

averaging characteristic values of a last Y match results searched to generate an average value, and replacing the center value of the match range with the average value, wherein Y is a preset constant; and restarting the selecting from a position corresponding to a file having a match result when the selecting ends, and continuing the selecting until completion.

3. The image filtering method according to claim 1, wherein the computing and acquiring the characteristic values of the plurality of images, and storing the characteristic values in the specific chronological order comprises:

computing and analyzing the plurality of images using one or more image identification technologies according to a consistent standard, and storing a resulting characteristic value corresponding to each of the plurality of images in the specific chronological order.

4. The image filtering method according to claim 1, wherein the computing and acquiring the sample characteristic value of the sample image comprises:
computing and acquiring the sample characteristic value from one of an image identification analysis and a user input.

5. The image filtering method according to claim 1, wherein the preset condition comprises the characteristic values of the filtered images being identical or within a match range of the sample characteristic value, wherein the match range of the sample characteristic value is a predetermined fault-tolerance or a fuzzy range of the sample characteristic value.

6. An image filtering system, wherein the image filtering system comprises:
a pre-storage module including at least one processing chip configured to compute and acquire a sample characteristic value of a sample image in advance and storing the sample characteristic value in a first database;
a ranking module including at least one processing chip configured to rank a plurality of images in a specific chronological order, wherein the specific chronological order is one of an increasing order along a time axis, a decreasing order along the time axis, and an order of ranking along either direction of the time axis from a time point;
a characteristic value acquisition module including at least one processing chip configured to compute and acquire characteristic values of the plurality of images using one or more image identification technologies, and storing the plurality of images and corresponding characteristic values in the specific chronological order; and
a filtering and displaying module including at least one processing chip configured to compare the characteristic values of the plurality of images with the sample characteristic value, selecting, from the plurality of images, filtered images conforming to preset conditions, deleting, from the plurality of images, images with characteristic values not conforming to the preset conditions, storing the filtered images in the specific chronological order in a second database, and displaying the filtered images,
wherein the filtering and displaying module comprises:
a determination unit including at least one processing chip configured to adjust a width and a center value of a match range of the sample characteristic value after the selecting ends or after a total number of files searched based on the width of the match range exceeds a time span allocated for target files to be searched during the selecting, wherein the match range of the sample characteristic value is a predetermined fault-tolerance or a fuzzy range of the sample characteristic value, wherein the width of the match range is a predetermined value.

7. The image filtering system according to claim 6, wherein the pre-storage module comprises:
an acquiring and receiving unit including at least one processing chip configured to compute and acquire the sample characteristic value from one of an image identification analysis and a user input.

8. The image filtering system according to claim 6, wherein the preset condition comprises the characteristic values of the filtered images being identical or within the match range of the sample characteristic value.

9. The image filtering system according to claim 6, wherein the filtering and displaying module comprises:
an adjustment unit including at least one processing chip configured to average characteristic values of a last Y match results searched to generate an average value, and replacing the center value of the match range with the average value, wherein Y is a preset constant.

10. The image filtering system according to claim 9, wherein the filtering and displaying module comprises:
a search unit including at least one processing chip configured to restart the selecting from a position corresponding to a file having a match result when the selecting ends, and continuing the selecting until completion.

11. The method of claim 3, wherein the computing and analyzing is done sequentially one-by-one for the plurality of images.

12. The image filtering system according to claim 6, wherein the pre-storage module is configured to compute and acquire the characteristic values of the plurality of images, and store the plurality of images and corresponding characteristic values in the specific chronological order by:
computing and analyzing the plurality of images using one or more image identification technologies according to a consistent standard, and storing a resulting characteristic value corresponding to each of the plurality of images and each of the plurality of images in the specific chronological order.

* * * * *